US005318752A

United States Patent [19]

Visser

[11] Patent Number: 5,318,752

[45] Date of Patent: Jun. 7, 1994

[54] METHOD AND APPARATUS FOR SAMPLING A REACTIVE ATMOSPHERE INTO A VACUUM CHAMBER OF AN ANALYZER

[76] Inventor: Jan Visser, Pruiskesweg 16, 6006 RT Weert, Netherlands

[21] Appl. No.: 7,840

[22] Filed: Jan. 22, 1993

[51] Int. Cl.$^{5}$ ........................ G01N 31/00; G01N 31/04

[52] U.S. Cl. ........................................ 422/83; 73/23.2; 73/23.35; 422/99

[58] Field of Search ...................... 432/83, 99; 73/23.2, 73/23.35; 55/269, 270

[56] References Cited

U.S. PATENT DOCUMENTS

| | | | |
|---|---|---|---|
| Re. 33,386 | 10/1990 | Douglas | 250/288 |
| 4,023,398 | 5/1977 | French et al. | 73/23.2 |
| 4,091,655 | 5/1978 | French et al. | 73/23.2 |
| 4,135,382 | 1/1979 | Capone | 73/23.2 |
| 4,137,750 | 2/1979 | French et al. | 73/23.2 |
| 4,718,268 | 1/1988 | Reid et al. | 73/23.2 |
| 4,902,099 | 2/1990 | Okamoto et al. | 356/316 |
| 4,935,624 | 6/1990 | Henion et al. | 250/288 |
| 5,009,849 | 4/1991 | Ebner et al. | 422/83 |

*Primary Examiner*—James C. Housel
*Assistant Examiner*—Ramon Torres
*Attorney, Agent, or Firm*—Harris Beach & Wilcox

[57] ABSTRACT

A method and apparatus for transferring a reaction gas between a high pressure environment and a low pressure environment. A baffle channel is disposed in a fluid communication path between the high pressure environment and the low pressure environment. Also disposed in the path is an element for limiting gas flow conductance. A shield gas is introduced into the baffle channel and a longitudinal laminar counterflow of the shield gas established toward the high pressure environment, opposing the flow of the reaction gas toward the low pressure environment. The shield gas hinders access of the reaction gas to the element for limiting gas flow conductance, so that a desired ratio of partial pressures of the gas to be transferred in the high pressure environment exceeds the partial pressure of that gas at the end of the baffle channel nearest the low pressure environment, protecting the element for limiting gas flow conductance, and regulating the amount of reaction gas transferred into the low pressure environment.

13 Claims, 4 Drawing Sheets

METHOD AND APPARATUS FOR SAMPLING A REACTIVE ATMOSPHERE INTO A VACUUM CHAMBER OF AN ANALYZER

BACKGROUND OF THE INVENTION

1. Field of the Invention

This invention relates to a method and apparatus for introducing samples of a gas into a vacuum chamber. More particularly, this invention relates to a method and apparatus for introducing samples of a chemically reactive atmosphere at relatively high pressure into the low pressure chamber of a mass spectrometer.

2. Description of the Prior Art

Mass spectrometers are extensively utilized to provide information concerning the components of a gas mixture. A typical application is chemical vapor deposition, where gas samples from the process reactor are analyzed by a mass spectrometer, the information obtained thereby being used to control the partial pressures of active components in the process reactor. The technique is also used to monitor the progress of chemical reactions wherein the reactants are in a gaseous state.

The analyzer chamber of a mass spectrometer is maintained at sufficiently low pressure, usually below $10^{-4}$ Torr, to assure that ion separation is not hindered by collisons with gas molecules. It is often the case that the pressure in the process reactor exceeds the maximum permissible pressure in the mass spectrometer. For example sputtering, in which a source material is subjected to ion bombardment, usually takes place at pressures from $10^{-3}$ to the low $10^{-2}$ Torr range. Other examples of processes that are conducted at pressures beyond the operational range of mass spectrometers are chemical vapor deposition and etching processes. In such cases the mass spectrometer is provided with its own pumping system in order to maintain desired pressure conditions in its vacuum chamber.

As the gas samples being introduced from outside the vacuum chamber are at relatively high pressure, in order to achieve pressure reduction a component having a low gas flow conductance is interposed between the vacuum chamber and the process reactor. This is usually one or more very small orifices.

Many of the above mentioned processes employ highly reactive or corrosive gases that can attack the mass spectrometer. A longstanding problem in the analysis of such gases has been degraded performance of the mass spectrometer due to reaction of its components with these gases. Another problem in the art is the deposition or sorption of non-volatile reaction products on the surfaces of the spectrometer, leading to undesirable memory effects or signal drift. Such reaction products can even obstruct the orifice and thus completely invalidate the analysis. Orifice blocking is particularly severe in chemical vapor deposition processes that are performed at pressures exceeding 1 Torr, and rising as high as atmospheric pressure. The sampling orifice must be extremely small to accommodate such high pressures and is consequently highly vulnerable to physical obstruction by reaction products.

It has been attempted to retard the interaction of reactants with the components of the mass spectrometer by reducing gas flow into the vacuum chamber. When this is done by reducing the orifice size, blocking becomes more severe. Furthermore the small orifice can limit the signal developed from the sample and hence the sensitivity of the mass spectrometer. A more satisfactory approach uses staged pressure reduction, in which the vacuum chamber of the mass spectrometer is separated from the process reactor by a plurality of intervening chambers, each having a progressively lower pressure, and having larger orifices for fluid flow therebetween. This method, however, requires complex and expensive apparatus, and due to practical limitations on vacuum pump capacity, the gain in orifice size is limited.

Another approach is shown in French et al, U.S. Pat. No. 4,023,398, in which a gas curtain flows through a chamber disposed between an ionization region and a vacuum chamber. The curtain blocks gas flow through an orifice leading to a mass spectrometer. The chamber containing the curtain gas constitutes a dead space that limits the switching rate of the protective effect of the curtain. Furthermore the degree of blocking of the orifice by the curtain cannot easily be controlled. In practice this approach requires high curtain gas flows to provide effective protection, and the gas has to be separately pumped. As the curtain gas flow is high, only condensable cryopumped curtain gases are feasible in many mass spectrometric applications, as other commonly used pumping methods cannot easily provide high pumping rates in the small volume of a mass spectrometer housing. Furthermore in order not to affect the chemical process being carried out, it is desirable to minimize the volume of protective gas that is introduced to the reaction. The high curtain gas flows needed in the French approach directly conflicts with this requirement.

SUMMARY OF THE INVENTION

It is therefore an object of the present invention to provide improved protection for a sampling orifice and for the components of an analyzer against the deleterious effects of chemicals and reactants in a gas being sampled.

It is another object of the present invention to provide a reliably controlled flow of a gas being sampled from a reaction chamber into the vacuum chamber of an analyzer without interference with the reaction being carried out in the reaction chamber.

It is still another object of the present invention to rapidly switch the sampling orifice of an analyzer between a protected mode to an operating mode in order to minimize exposure of the orifice and the analyzer to chemicals in the reaction environment.

It is yet another object of the present invention to adjust the sensitivity of an analyzer that is measuring a reactive atmosphere.

These and other objects of the present invention are attained according to one aspect of the invention by an apparatus in which a baffle channel connects a low pressure environment in a fluid communication path extending to a high pressure environment. The high pressure environment contains a process gas or reaction gas to be transferred to the low pressure environment. The fluid communication path has a barrier containing a small orifice for limiting gas flow conductance therethrough into the low pressure environment. The baffle channel also includes an inlet tube for introducing therein a shield gas, located between the orifice and the high pressure environment, and dimensioned such that a longitudinal laminar counterflow of shield gas becomes established in the baffle channel toward the high pressure environment, the counterflow opposing a flow of reaction gas toward the orifice. Consequentially the flow of the reaction gas toward the low pressure environment is hindered, and its partial pressure in the high pressure environment exceeds its partial pressure in the baffle channel at the end thereof that is nearest the low pressure environment. In accordance with one aspect of the invention the barrier is located at an end of the baffle channel; in accordance with another aspect of the invention the barrier need not necessarily be in the baffle channel, so long as it is located in the fluid path between the high pressure environment and the low pressure environment. In one embodiment of the invention the shield gas is introduced into the baffle channel proximate the high pressure side of the barrier. The flow rate of shield gas into the baffle channel can be varied in order to achieve a desired ratio of partial pressures of the reaction gas. In another embodiment of the invention the baffle channel has an auxiliary outlet connected to an evacuation pump, so that gas can rapidly be evacuated from the baffle channel, and a new population of gas molecules quickly established therein. According to yet another aspect of the invention, the counterflow of shield gas in the baffle channel can be in a transitional region from molecular to laminar.

According to still another aspect of the invention, the low pressure environment is the vacuum chamber of an analyzer, such as a quadrupole or other type of mass spectrometer, and the high pressure environment is a reaction chamber in which a chemical reaction is occurring.

Current chemical vapor deposition (CVD) processes operate under laminar flow. CVD processes and many etching processes, particular those concerned with single wafers, usually employ a substantial excess of one of the reactant gases, or use a large amount of an inert carrier gas. For example nitride CVD processes use a large excess of nitrogen. TEOS oxide deposition machines usually apply a large amount of an inert carrier gas. According to the present invention, a shield gas, which can be a suitable inert or excess reactant gas, is delivered near the orifice at its high pressure side and establishes a laminar flow through a baffle channel which is disposed between the orifice and the process reactor. The laminar shield gas flow hinders the flow of reaction gas from the reactor to the orifice. In practice the shield gas can be a small fraction of the excess of one of the reaction gases, or a small fraction of the inert carrier gas supplied to the reactor.

The protective effect of the shield gas can be expressed by:

$$\frac{P_{upstream}}{P_{downstream}} = e^{\frac{Q}{p}\cdot\frac{l}{AD_l}}$$

in which

Q is gas flow of the shield gas;

p is shield gas pressure;

$p_{upstream}$ and $p_{downstream}$ are the partial pressures of reactive gases at the reactor and orifice ends of the baffle channel respectively;

l is length of the baffle channel;

A is cross sectional area of the baffle channel;

$D_l$ is diffusion coefficient; and e is base of the natural logarithm.

$D_l$ is inversely proportional to p. Thus, for a given reactive gas, Q, l, and A are the parameters determining the pressure ratio, i.e., the shielding effect. It appears that extremely high pressure ratios, in other words nearly full protection, can be achieved for many applications. The above equation is idealized and assumes a uniform velocity of the gas over cross-sectional area A. In practice, when the gas flowing through an element has a velocity profile in area A, somewhat lower ratios will be obtained. For a silane-ammonia-nitrogen gas mixture of a silicon nitride deposition process carried out in a commercial reactor, typical process gas flows are 135 sccm silane, 66 sccm ammonia, and 2500 sccm nitrogen. A nitrogen shield gas flow of 100 sccm will not disturb the process reaction. With $l/A = 4\ cm^{-1}$ and Q=100 sccm the pressure ratio according to the equation given above is about $2.8 \times 10^{27}$. This high pressure ratio may be considered as complete protection. It will be clear that Q can be adjusted between 0 and 100 sccm to achieve the desired level of protection. In practice usually two levels of protection are applied: namely full protection between measurements; and partial protection during sampling. In order to achieve rapid switching, the response time needed to replace the shield gas being used for full protection by the gas to be sampled in the baffle channel, or vice versa, must be short. The volume of the baffle channel is $A \times l$, and the volumetric flow governed by diffusion can be expressed as $(A/l) \times D_l$. Hence the response time is dictated by $l^2$ and $D_l$, and not by A. By selecting the proper length of the baffle channel, short response times can be obtained. For example a length of 1 cm makes it possible to achieve a response time of less than 1 second for process gas pressures up to about 80 Torr.

EXAMPLE

To illustrate the advantages of the "shielded" mass spectrometer sampling method over the methods of the prior art, the application of an Applied Materials CVD 5000 silicon nitride deposition system will be considered. The deposition process sequence of a 9000 Å silicon nitride thin film is as shown in Table 1.

TABLE 1

| | Time (sec) | Pressure (Torr) | $N_2$ flow (sccm) | $SiH_4$ flow (sccm) | $NH_3$ flow (sccm) |
|---|---|---|---|---|---|
| 1. Heat-up wafer | 10 | 5 | 3000 | 125 | 50 |
| 2. Deposition | 83 | 5 | 3000 | 125 | 50 |
| 3. Purge | 5 | $<<5$ | 3000 | — | — |
| 4. Pump | 5 | $<<5$ | — | — | — |

The CVC 5000 is a single wafer system using a clean etch process in between deposition runs in order to remove deposits on electrodes and other reactor chamber components facing the plasma. The clean etch process steps are shown in Table 2.

TABLE 2

| | Time (sec) | Pressure (Torr) | $NF_3$ flow (sccm) | $N_2O$ flow (sccm) | $N_2$ flow (sccm) |
|---|---|---|---|---|---|
| 1. Stabilize | 10 | $\approx 0.1$ | 300 | 150 | — |
| 2. High power etch | 30 | $\approx 0.1$ | 300 | 150 | — |
| 3. Low power etch | 75 | $\approx 0.1$ | 200 | 50 | — |
| 4. Purge | 5 | — | — | — | 4000 |

At 5 Torr the response time for the exchange of the gases in the baffle channel will be approximately 0.25 sec per cm of channel length. A nitrogen shield gas flow of 100 sccm is permitted. By choosing a channel with $l=2$, and $A=0.5$ $cm^2$ in combination with a 50 sccm shield gas flow, very efficient shielding, having a pressure ratio of $5\times10^{13}$, is obtained, while the response of the measurement, about 1 second, is very short in comparison to the deposition time. The dimensions of the baffle channel are sufficiently large to make the pressure difference between the ends of the baffle channel negligible.

BRIEF DESCRIPTION OF THE DRAWINGS

For a better understanding of these and other objects of the present invention, reference is made to the de tailed description of the invention which is to be read in conjunction with the following drawings, wherein.

DESCRIPTION OF THE PREFERRED EMBODIMENT

While the preferred embodiment of the invention is discussed with reference to a mass spectrometer, it will be understood by those skilled in the art that it can be practiced in conjunction with other analyzers that require low pressure chambers for their operation.

Figure 1:
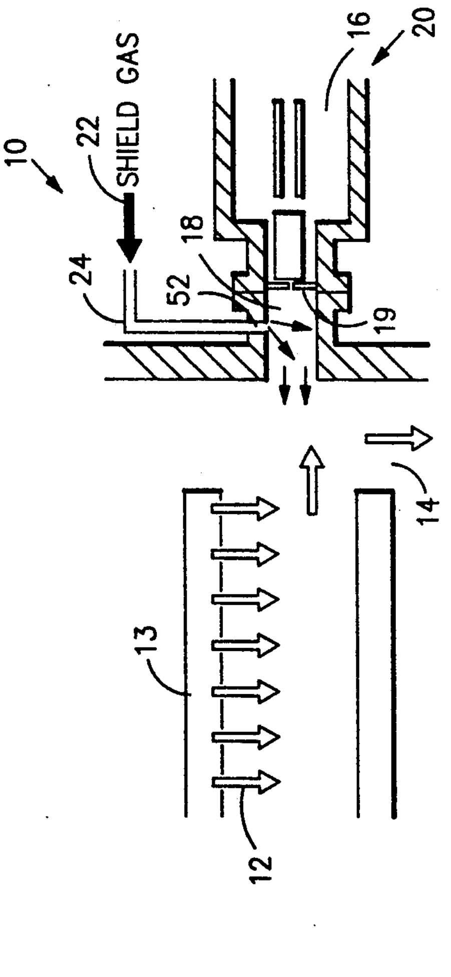
FIG. 1 is a diagrammatic view of a first embodiment of an apparatus in accordance with the present invention.

Turning now to the drawings, and initially to FIG. 1, there is diagrammatically shown a preferred embodiment of the invention, referenced generally at 10, wherein a process gas 12, indicated by the open arrows in FIG. 1, is admitted by gas inlet 13, which can be a shower gas inlet or any suitable type of gas inlet, into a relatively high pressure process or reaction chamber 14. Samples of process gas 12 flow through baffle channel 18, and are admitted through one or more small inlet orifices 19 into a low pressure chamber 16 of a mass spectrometer 20. Inlet orifices 19 are dimensioned to limit gas flow conductance therethrough. A shield gas 22, indicated by the solid arrows in FIG. 1, is delivered through inlet 24 from a source (not shown) by any suitable means, and is introduced into baffle channel 18, preferably proximate the high pressure side of inlet orifice 19, so that the gas pressure in baffle channel 18 exceeds the pressure in process chamber 14. Shield gas 22 can be handled, for example, by a turbomolecular pump, a diffusion pump, or can simply be transferred from a high pressure source. The relatively low volumes of shield gas required, as compared with prior art methods, allows great flexibility in the choice of shield gas handling methods. The baffle channel dimensions and the shield gas flow volume are tailored to the application, and are designed to establish a laminar counterflow of shield gas in baffle channel 18 in the direction of process chamber 14. This counterflow, comprising most of the shield gas, results in a net flow of gas from the baffle channel 18 into the process chamber 14. A small fraction of the shield gas 22 passes through inlet orifice 19. While a laminar counterflow of shield gas is preferred, some protective effect can be obtained even when the flow is in a transition zone between molecular and laminar.

Figure 2:
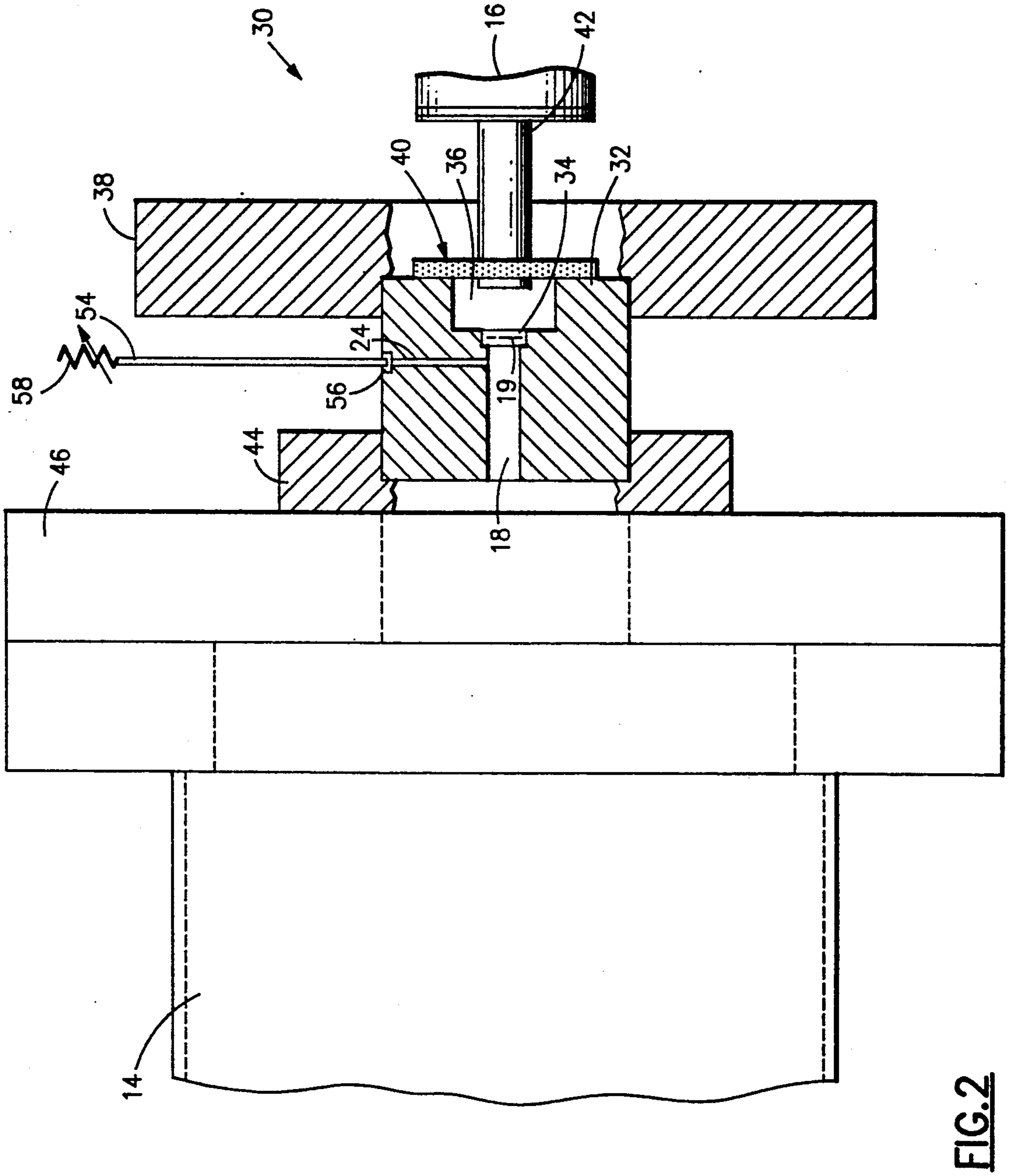
FIG. 2 is a more detailed, partially schematic sectional view of a shield gas inlet system in accordance with the embodiment of FIG. 1.

The structural detail of the apparatus is best understood with reference to FIG. 2, in which parts analogous to those shown in FIG. 1 are given like reference numerals. In a portion of the apparatus containing the shield gas inlet assembly, shown generally at 30, there is a cylinder 32 having at one end a cylindrical baffle channel 18 bored therein. The opposite end of cylinder 32 has a recess 36 adapted to receive plate 34, one side of plate 34 forming the base of recess 36, and the opposite side forming an end plate for baffle channel 18. Orifice 19 is realized as eight small apertures disposed in plate 34 to place recess 36 and baffle channel 18 in limited fluid communication. Sensor manifold 42 connects low pressure chamber 16 in sealed fluid communication with recess 36. The seal is established by ceramic seal 40 which resides in sensory manifold connector 38, a CF-63 conflat flange. A low pressure environment is thus maintained within recess 36, plate 34 forming a barrier separating the low pressure in recess 36 from a higher pressure environment in the baffle channel 18 on the other side of plate 32. Orifice 19 is dimensioned to allow a suitable flow of gas across the barrier.

The opposite end of baffle channel 18 is sealably connected with process chamber 14 by a CF-35 conflat flange 44 and a CF-100 to CF-35 adaptor flange 46 for mounting assembly 30 directly on the walls of process chamber 14. This arrangement permits baffle channel 18 to be located almost within the volume of process chamber 14.

Shield gas inlet 24 is a long hole bored from one side of cylinder 32 into the baffle channel 18. Capillary tubing 54 is used to connect a needle valve 58 to the shield gas inlet port 56. In many applications the shield gas flow can be obtained from the process gas inlet system (not shown).

The dimensions of the above described preferred embodiment are given in table 3.

TABLE 3

| | Length (cm) | Diameter (cm) | Volume ($cm^3$) |
|---|---|---|---|
| Baffle Channel 18 | 2.0 | 0.5 | 0.39 |
| Shield gas inlet 24 | 1.48 | 0.076 | |
| Distance between shield gas inlet 24 and orifice 19 | 0.32 | | |
| Capillary tube 54 | 7.62 | OD 0.152 ID 0.051 | |
| Orifice 19 (total of eight) | | 4.5 microns each | |
| Capillary tube 54 + Shield gas inlet 24 | | | 0.02 |

Figure 3:
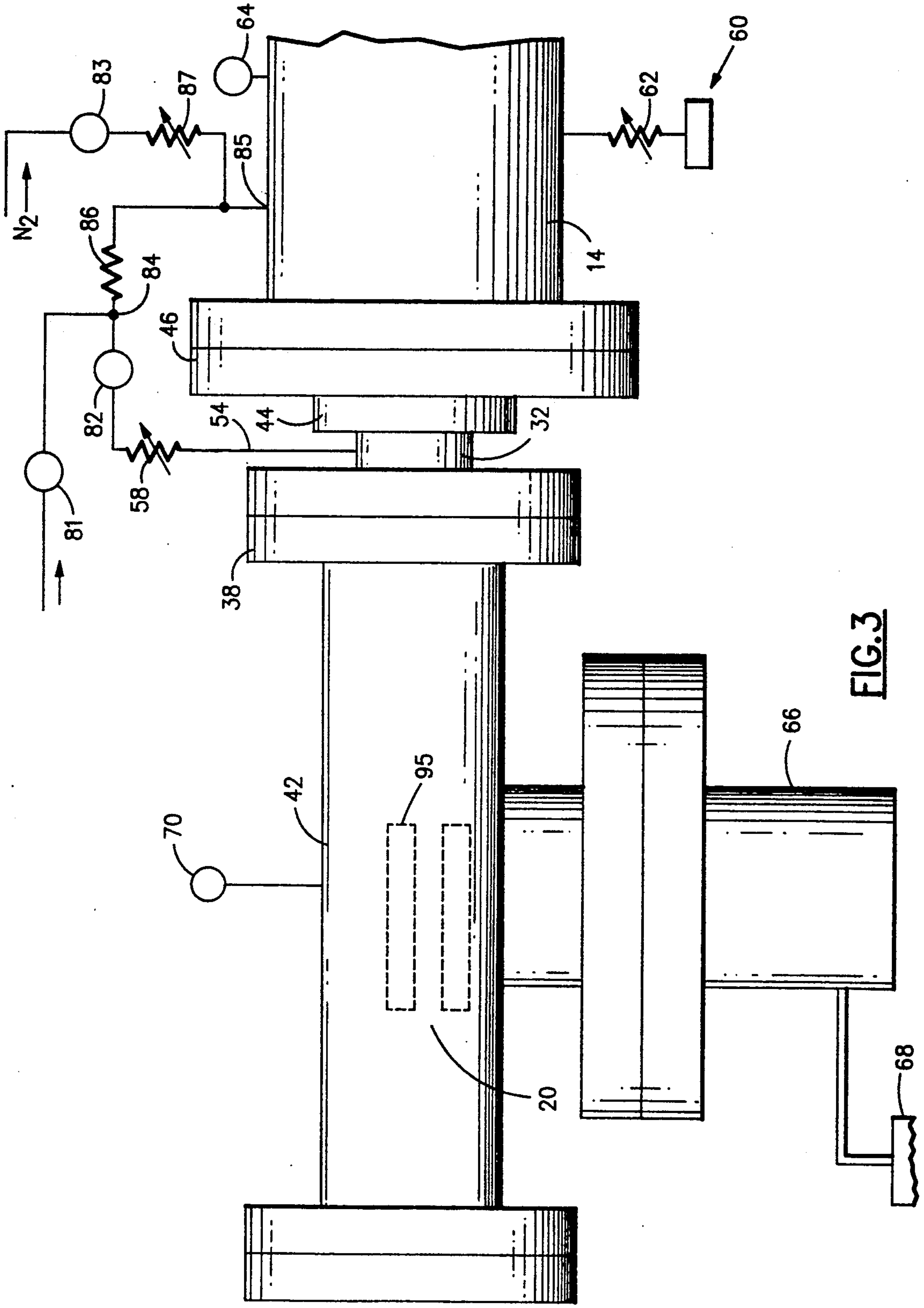
FIG. 3 is a partially schematic side elevation of the embodiment shown in FIG. 2 which has been connected to test apparatus.

Referring now to FIG. 3, there is shown a partially schematic test arrangement of a preferred embodiment of the invention which was used in the Examples given below. Internal detail not shown in FIG. 3 is the same as in FIG. 2, and the dimensions of the test embodiment are as given in Table 3. It is evident from Table 3 that the volume of the capillary tube and shield gas inlet are small in comparison with the volume of the baffle channel, the latter being approximately 20 times as large as the volume in the shield gas flow tubing and inlet combined.

Process gas, argon carrier gas in the tests herein, enters the system through flowmeter 81. Needle valve 86 is set to regulate the flow out of flowmeter 81 at 1000 sccm. The gas inlet system allows a small portion of the process gas to be used as the shield gas. This is diverted to the shield gas inlet port 56 through a T-connector 84 by setting flowmeter 82 to the desired shield flow with needle valve 58.

A contaminant gas, nitrogen in the tests herein, enters the system through flowmeter 83, its flow being regulated by valve 87. At a junction point downstream of valve 87 and needle valve 86 the process and contaminant gases mix and enter the process chamber 14 at point 85.

In the test system shown in FIG. 3, process chamber 14 is a 2.5 liter vessel in which a desired internal pressure is provided by rotary vane pump 60, the action of which is regulated by throttle valve 62. A 100 Torr capacitance manometer 64 is mounted on process chamber 14. Sensor manifold 42 houses a quadropole sensor 95 having a closed ion source mounted thereon, and is pumped by a Leybold model TMP-50 66 turbomolecular pump discharging to a rotary vane pump 68. Ionization gauge 70 is used to monitor pressure within sensory manifold 42.

Working Example 1—Time Response: In this test, the time required for the contaminant gas to reach 90% of its steady state level after cutting off the flow shield gas was determined. This information is a useful predictor of the time required for the mass spectrometer 20 to detect an impurity or contaminant in a process gas that diffuses through baffle channel 18 when the orifice 19 is not protected by a laminar flow of shield gas. In this example mass spectrometer 20 was driven with CIS transpector electronics. Needle valve 58 is operated manually.

Figure 4:
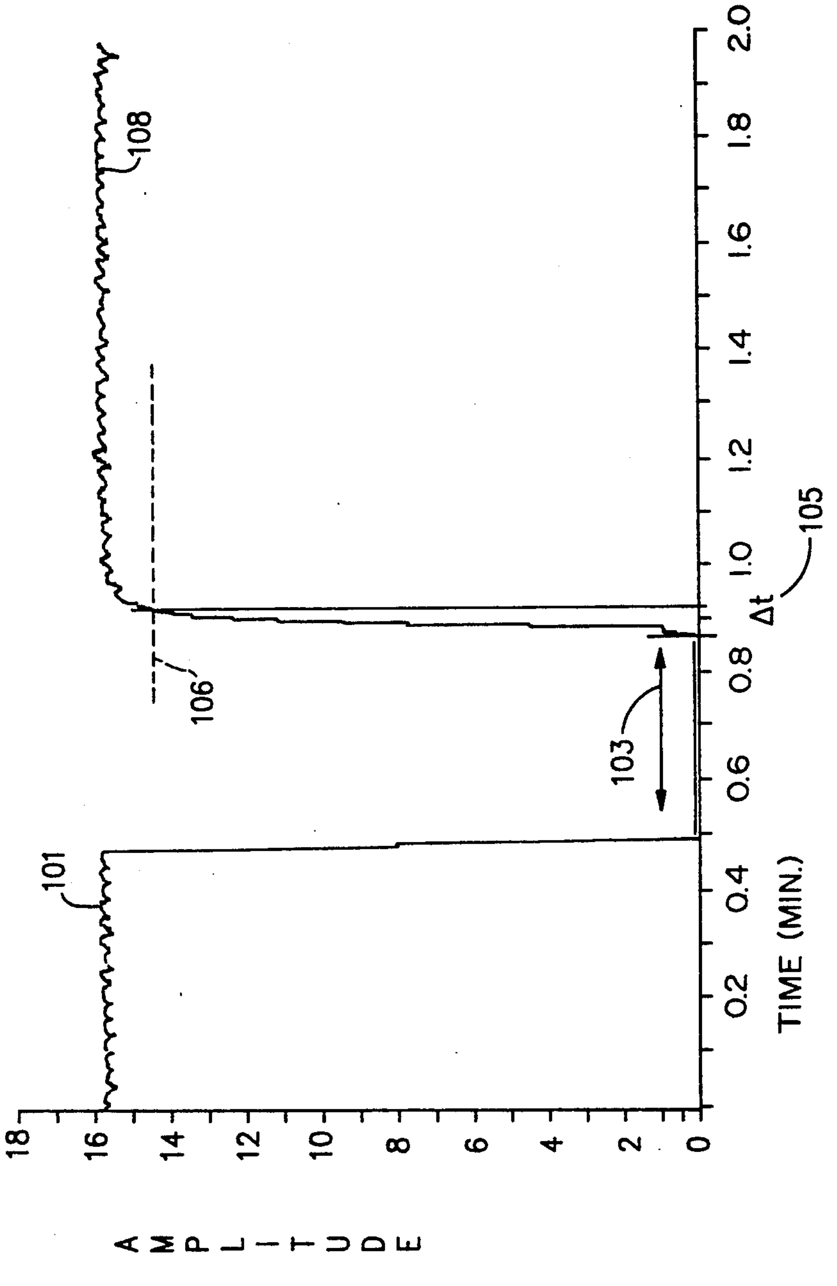
FIG. 4 is a representative graphical plot of a response of the apparatus of FIG. 3 to a contaminant gas.

Time response tests, which may be understood with reference to FIG. 4, were conducted in the following manner. FIG. 4 presents a typical response, but does not necessarily describe a particular test result herein. The process gas (argon) was set to a flow rate of 1000 sccm at process pressures to 25, 50, 76, and 98 Torr, with the flow rate of contaminant gas (nitrogen) held constant at 100 sccm. At each of the process pressures, the time response was measured at shield gas flows of 10, 25, 50, 75, and 100 sccm in accordance with the following steps:

(1) Contaminant gas present in the process gas was allowed to diffuse to the mass spectrometer with the shield flow off and monitored until a steady state level 101 as detected by the mass spectrometer was achieved.

(2) After monitoring the contaminant for approximately 45 seconds, the shield flow was turned on for 30 seconds, shown in FIG. 4 as interval 103.

(3) The shield gas flow was then turned off again, and the contaminant allowed to diffuse to the mass spectrometer. The time, Δt 105 to attain 90% of the steady state level 101 was recorded. In FIG. 4, Δt 105 is 4 seconds, and the 90% level is indicated as dashed line 106. Return to the steady state is indicated by line segment 108 of the tracing.

The results are given in Table 4

TBLE 4

| Process Pressure (Torr) | Shield Gas Flow (sccm) | Time Response (sec) |
|---|---|---|
| 25 | 10 | 4 |
| | 25 | 8 |
| | 50 | 10 |
| | 75 | 6 |
| | 100 | 6 |
| 50 | 10 | 6 |
| | 25 | 10 |
| | 50 | 9 |
| | 75 | 10 |
| | 100 | 8 |
| 76 | 10 | 7 |
| | 25 | 8 |
| | 50 | 9 |
| | 75 | 13 |
| | 100 | 14 |
| 98 | 10 | 5 |
| | 25 | 6 |
| | 50 | 15 |
| | 75 | 15 |
| | 100 | 11 |

Working Example 2—Shielding Ratio: In this example, the amount of shielding provided by the shield gas flow was determined by taking the ratio of the partial pressure of the contaminant detected by the mass spectrometer with the shield flow on to the partial pressure of the contaminant detected with the shield flow off. This was done at process pressures of 50, 76, and 98 Torr with shield gas flows set at 10, 25, and 50 sccm. The process flow (argon) was held constant at 1000 sccm, and the contaminant (nitrogen) set at 100 sccm. The shielding ratios measured are summarized in Table 5.

TABLE 5

| Shield flow | Process Pressure | | |
|---|---|---|---|
| (sccm) | 50 Torr | 76 Torr | 98 Torr |
| 10 | 2.37e-02 | 2.58e-02 | 2.29e-02 |
| 25 | 1.23e-03 | 9.75e-04 | 8.08e-04 |
| 50 | 1.01e-03 | 8.84e-04 | 5.46e-04 |

In a suitable application, for example, in a mass spectrometer wherein the ion source can operate at the pressure of the reaction chamber, it is possible to locate orifice 19 between the ion source and the analyzer portion of the mass spectrometer, rather than at the end of the baffle channel 18 as shown.

Figure 5:
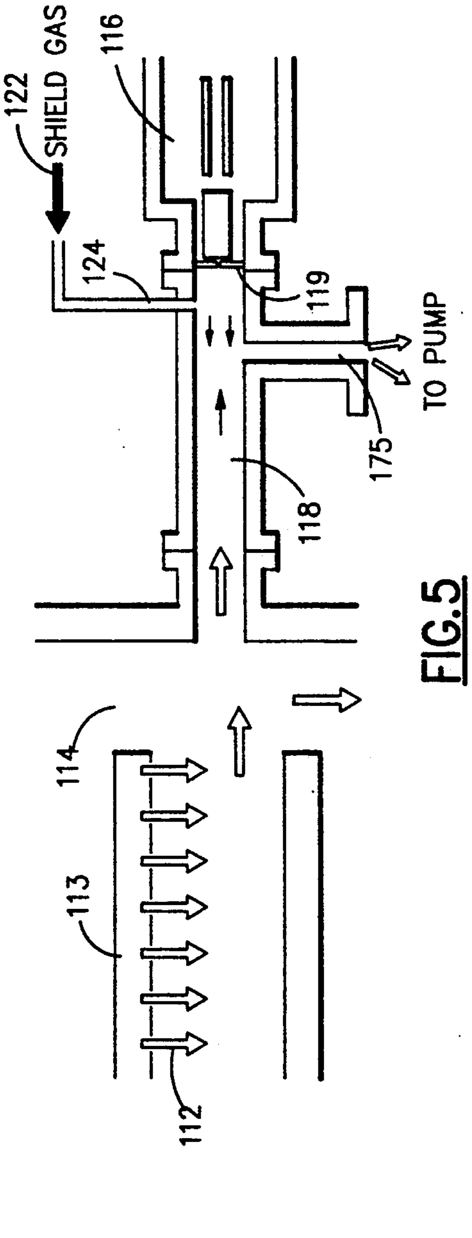
FIG. 5 is a diagrammatic view of a second embodiment of an apparatus in accordance with the present invention.

Referring now to FIG. 5 there is schematically shown an alternate embodiment of the invention. In general the construction is similar to that of the first embodiment, but the baffle channel 118 is somewhat longer. From the equation given above, it will be evident that a greater protection for the orifice 119 can be achieved by lengthening the baffle channel, but at a cost in response time. To increase the rate of evacuation of the contents of baffle channel 118 an outlet 175 is provided, leading to an evacuation pump (not shown). It is desirable that the diameter of outlet be relatively large to increase flow conductance, and in practice an instantaneous shutoff valve (not shown) may be provided to close the outlet when it is not in use.

In one mode of operation the evacuation pump may be left in continuous operation, so that process gas 112 follows a relatively long path along baffle channel 118 between reaction chamber 114 and the outlet 175, encountering a relatively short counterflow of shield gas 122 at the mouth of outlet 175. This arrangement has the advantage that virtually no shield gas ever enters the reaction chamber 114, and the reaction occurring therein can proceed completely undisturbed by the monitoring process.

In a second mode of operation, the evacuation pump is left off, or the outlet 175 blocked by a switching device (not shown), so that it operates in the same manner as the first embodiment. However when it is desired to rapidly establish a new equilibrium in baffle channel 118, the shield gas may optionally be cut off, the outlet 175 reopened and the evacuation pump started to quickly purge baffle channel 118 of gas that is representative of a previous state of the reaction in the reaction chamber 114. The contents of baffle channel 118 are then replaced by new process gas, representing a current state of the reaction. Purging the baffle channel thus avoids analytic error due to carry over in a subsequent monitoring operation.

While this invention has been explained with reference to the structure disclosed herein, it is not confined to the details set forth and this application is intended to cover any modifications and changes as may come within the scope of the following claims:

What is claimed is:

1. An apparatus for analyzing a reaction gas, comprising:

an analyzer, having therein a low pressure chamber connected in a fluid communication path extending to a high pressure environment through an elongated baffle channel disposed therebetween, said high pressure environment having a reaction gas to be analyzed;

means for introducing a shield gas into said baffle channel and for establishing a laminar counterflow thereof in said baffle channel toward said high pressure environment, said counterflow being in an opposite direction to a flow of said reaction gas into said low pressure chamber via said baffle channel; and means disposed in said fluid communication path for limiting gas flow conductance between said high pressure environment and said low pressure chamber;

whereby a first partial pressure of the reaction gas in said high pressure environment exceeds a second partial pressure of the reaction gas in said baffle channel at an end thereof proximate said low pressure chamber.

2. The apparatus according to claim 1, wherein said means for limiting gas flow conductance is disposed in said baffle channel, and said shield gas is introduced therein intermediate said means for limiting gas flow conductance and said high pressure environment.

3. The apparatus according to claim 1, further comprising means for varying a flow rate of said shield gas into said baffle channel, whereby a desired ratio of said first and said second partial pressures can be achieved.

4. The apparatus according to claim 1, further comprising means for evacuating said baffle channel through an auxiliary outlet thereof.

5. The apparatus according to claim 1, further comprising pump means for maintaining a pressure differential between said high pressure environment and said low pressure chamber.

6. The apparatus according to claim 1, wherein said means for introducing produces a counterflow of shield gas in a transitional zone between molecular and laminar flow.

7. The apparatus according to claim 1, wherein said means for limiting gas flow conductance comprises a barrier having an orifice therein.

8. The apparatus according to claim 7, wherein said analyzer is a mass spectrometer.

9. An apparatus for analyzing samples of a gas in a high pressure reaction environment, comprising:

a mass spectrometer, having a low pressure chamber containing an ionization section and an analyzer section therein, said low pressure chamber being connected in a fluid communication path extending to the high pressure reaction environment through an elongated baffle channel disposed therebetween, said reaction environment having therein a reaction gas to be analyzed, said reaction gas being transferred into said low pressure chamber via said baffle channel;

an inlet tube, connected to a source of a shielded gas and leading into said baffle channel for introducing said shield gas into said baffle channel and producing a laminar axial counterflow of said shield gas in said baffle channel that opposes an opposite longitudinal flow of said reaction gas through said baffle channel; and a barrier disposed in said path intermediate said inlet tube and said low pressure chamber and having an orifice for limiting gas flow conductance therethrough;

whereby a first partial pressure of the reaction gas in said reaction environment exceeds a second partial pressure of the reaction gas in said baffle channel proximate said orifice.

10. The apparatus according to claim 9, further comprising means for varying a flow rate of said shield gas into said baffle channel, whereby a desired ratio of said first and said second partial pressures can be achieved.

11. The apparatus according to claim 9, further comprising means for evacuating said baffle channel in order to establish the reaction gas therein.

12. The apparatus according to claim 9, wherein said mass spectrometer is a quadrupole mass spectrometer, and further comprising pump means for maintaining a pressure differential between said reaction environment and said low pressure chamber.

13. The apparatus according to claim 9, wherein said means for introducing a shield gas is disposed intermediate said first end and said means for limiting gas flow conductance.

* * * * *